S. F. BOWSER.
SOLDERING MACHINE.
APPLICATION FILED JAN. 12, 1911.

1,123,081.

Patented Dec. 29, 1914.
2 SHEETS—SHEET 1.

Witnesses:
Inventor:
Sylvanus F. Bowser
By Brown & Hopkins
Attys.

S. F. BOWSER.
SOLDERING MACHINE.
APPLICATION FILED JAN. 12, 1911.
1,123,081.
Patented Dec. 29, 1914.
2 SHEETS—SHEET 2.
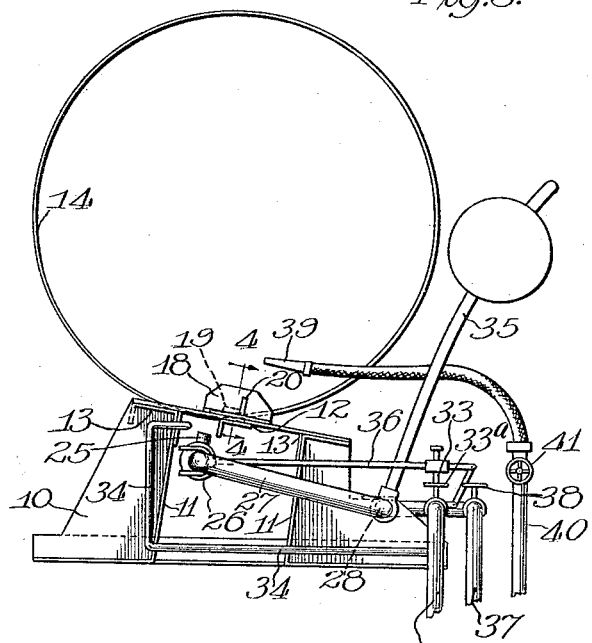
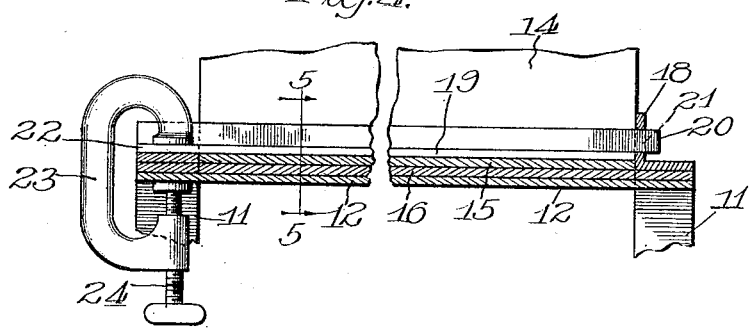
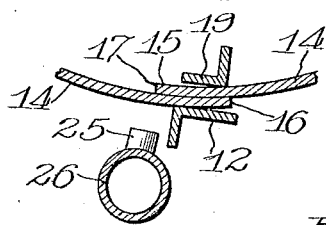
Witnesses:
Inventor:
Sylvanus F. Bowser
By Brown & Hopkins
Attys.

UNITED STATES PATENT OFFICE.

SYLVANUS F. BOWSER, OF FORT WAYNE, INDIANA, ASSIGNOR TO S. F. BOWSER & COMPANY, INCORPORATED, OF FORT WAYNE, INDIANA, A CORPORATION OF INDIANA.

SOLDERING-MACHINE.

1,123,081.     Specification of Letters Patent.     Patented Dec. 29, 1914.

Application filed January 12, 1911. Serial No. 602,225.

*To all whom it may concern:*

Be it known that I, SYLVANUS F. BOWSER, a citizen of the United States, residing at Fort Wayne, in the county of Allen and State of Indiana, have invented certain new and useful Improvements in Soldering-Machines, of which the following is a specification.

This invention relates to improvements in soldering machines, particularly adapted for use in soldering the long or flat seams of tanks or receptacles which are of cylindrical shape in cross section and one of the primary objects of the present invention is to provide an improved, simple, durable and efficient machine of this character.

A further object is to provide improved means for heating the seam to be soldered, and improved means whereby the heater or burner may be adjusted or moved out of the way after the completion of the soldering operation to permit the tank or receptacle to be readily removed and another placed in the machine.

A further object is to provide improved means for removably securing the article to be soldered in position in the machine for holding the same against displacement during the soldering operation.

To the attainment of these ends and the accomplishment of other new and useful objects, as will appear, the invention consists substantially in the features of novelty hereinafter more fully described and claimed and shown in the accompanying drawings exemplifying the invention, and in which—

Figure 1:
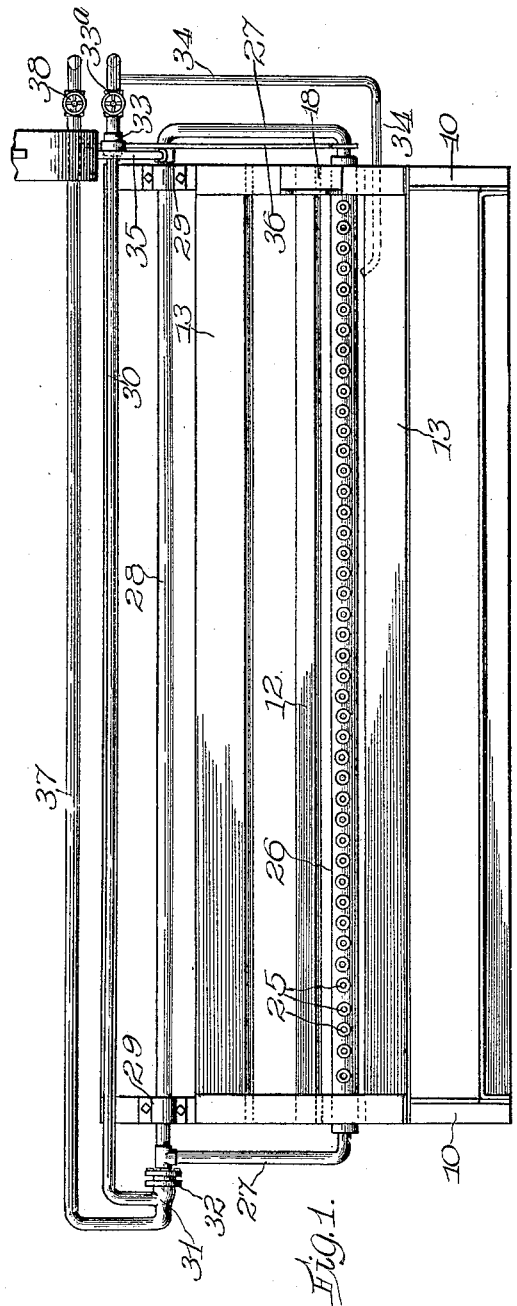
Figure 2:
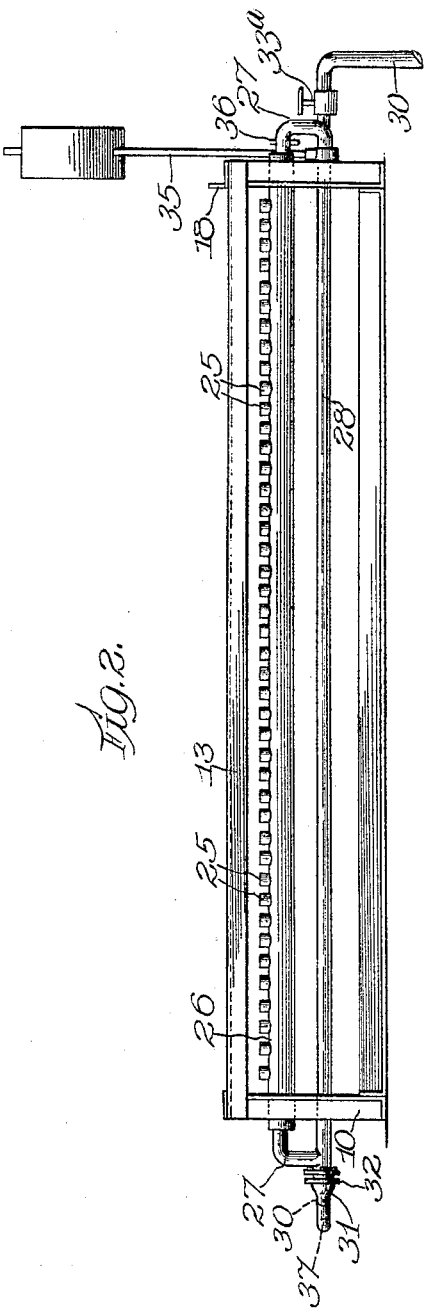

Figure 1 is a top plan view of an improved machine of this character constructed in accordance with the principles of this invention. Fig. 2 is a side elevation of Fig. 1. Fig. 3 is a right-hand end elevation of the parts shown in Fig. 1, showing a tank body secured in position in the machine for the soldering operation. Fig. 4 is an enlarged detail sectional view on line 4—4, Fig. 3. Fig. 5 is an enlarged sectional view on line 5—5, Fig. 4, and also showing in section a portion of the burner or heater.

Referring more particularly to the drawings and in the present exemplification of the invention the numeral 10 designates generally a suitable supporting base for the structure having uprights 11 rising therefrom and secured to these uprights and extending lengthwise of the base is a support 12 which may be constructed of any suitable material and is preferably flat to form a table or support for the article. This support 12 is preferably inclined as shown more clearly in Fig. 3 and the entire structure thus far described may be of any desired length and height. If desired, angle irons 13 may be provided for reinforcing the structure.

The tank body 14 is shaped in the ordinary and usual manner, that is to say, by overlapping the edges 15, 16, thereof, as shown more clearly in Fig. 5, and when thus shaped the tank body is placed upon the support 12 so that the shoulder 17 formed by the edge 15 will form an angular groove disposed in a position to hold the solder at the proper point when the latter is placed in the tank body, that is to say, the shoulder 17 will prevent the solder elements from flowing out of position. The tank body is secured to the support 12 in this position in any desired or suitable manner, so that it will not become displaced during the soldering operation. For this purpose there may be provided at one end of the support 12 an upright or flange 18 which is provided in its body portion with a slot. A member 19, preferably constructed of angle iron, is provided with a projecting portion 20 at one end thereof, which portion is preferably formed by cutting away a portion of one of the angles of the member 19. This portion 20 is adapted to be inserted into the opening 21 in the upright or flange 18 and the angle iron is of a length to extend the entire length of the tank body and to project beyond the other end thereof, as shown more clearly in Fig. 4. The extremity 22 of the angle iron is secured against displacement in any suitable manner, preferably by means of a clamp 23 which has engagement with the angle member 19 and also with the support 12 through the medium of an adjusting screw 24. When the tank body is placed in position upon the support 12, and the extremity 20 of the angle member 19 inserted into the opening 21 in the flange 18, and the clamp 23 applied to the free end of the angle member, it will be apparent that the tank body will be removably and securely held in position for the soldering operation. The support 12 is preferably inclined so that the tank body may be rolled thereon and after it has been soldered and detached from the support, it may be rolled therefrom onto any suitable receiving support.

Heat may be supplied to the joint formed by the overlapping edges 16, 15, by means of a series of burners or nozzles 25, any number of which may be provided and these nozzles 25 have communication with a tubular member or chamber 26, which latter extends for the entire length of the support 12 and is so arranged that the nozzles or burners 25 will be disposed to one side of the support and in such a position that the flame therefrom will be directed against the seam or joint of the tank body, this member or chamber 26 is adapted to be moved toward and away from the tank body in any suitable manner, such as by means of tubular arms 27 arranged one at each end of the chamber 26 and which have communication with the respective ends. The other ends of the arms 27 have communication with a pipe 28 which latter is preferably spaced from the chamber 26 and is parallel thereto. Portions of this pipe 28 are journaled in suitable bearings 29 in the main supporting frame. These arms 27 are connected to the pipe 28 in any desired or suitable manner, such as by means of the ordinary T-couplings, or if desired one of the arms may be formed integral with the pipe 28 by deflecting a portion of the pipe and the other may be secured thereto by means of the T-coupling.

The pipe 28 receives its supply of fuel to be supplied to the nozzles or burners 25 for heating the tank seam by means of a pipe 30 which receives its supply from any suitable source and to which pipe 30 the pipe 28 has communication as at 31. An ordinary joint may be provided for connecting the pipe 28 with the pipe 30, which joint embodies an ordinary and well known coupling which will permit the pipe 28 to be rotated with respect to the pipe 30 so as to raise and lower the chamber 26 to move the same toward or away from the tank and at the same time prevent the escape of fuel at the joint. A quick acting valve 33 in the pipe 30 controls the supply of fuel and a pilot tube 34 is also provided for lighting the burners 25.

In order to readily adjust the receptacle of the chamber 26 in the manner just described, a weighted arm 35 is provided which is connected to the pipe 28 in any suitable manner so that when the arm 35 is shifted the pipe 28 will be rotated in its bearings and the arm 35 is disposed at such an angle that when it is adjusted to move the burners 25 toward the tank seam, the weight on the arm will hold the burners in position, and when adjusted to move the burners away from the tank the weight on the arm 35 will also hold the burners in this position.

In order to automatically cut off the supply of fuel to the burners 25 when the arm 35 is adjusted to move the burners away from the tank, the valve 33 may be connected to one of the arms 27 in any suitable manner, preferably by means of a link or connection 36, as shown more clearly in Fig. 3.

Any suitable means may be provided for cooling the joint after it has been soldered so as to quickly set the solder and for this purpose the burners or nozzles 25 may be employed. To accomplish this end, an additional pipe 37 is provided which has connection with the pipe 28 preferably adjacent the joint 32 and a quick acting valve 38 is arranged in this pipe 37. The pipe 37 receives its source of supply of cooling fluid, preferably air, from any suitable source and is adapted to convey the air into the pipe 28 and from this pipe through the arms 27 into the chamber 26 to be discharged through the nozzles 25.

It is thought that the operation of this improved machine will be clearly apparent but briefly stated, is as follows: After the edges 16 and 17 of the tank body have been lapped and the body given its shape, it is placed upon the support 12 and secured thereto by means of the angle member 19. The lever 35 is then shifted to raise the burners or nozzles 25 to move them toward the seam. The joint having been first treated with the soldering flux in the usual manner, the solder is applied by placing solder elements within the tank body so that they will rest against the shoulders 17 formed by the overlapping edge 15. The solder is first applied before the burners are adjusted toward the tank. When these burners are placed into position they will be lighted by the pilot light and the flame will be directed against the seam, which will cause the solder elements to melt and flow into the seam. After the soldering operation is completed, the arm or lever 35 is adjusted in the opposite direction to lower the burners or to move them away from the tank and this adjustment of the burners will automatically close the valve 33 in a manner similar to the manner in which the adjustment of the nozzles toward the tank will open the valve. An additional valve 33ᵃ is provided and adapted to be closed to shut off the supply of fuel to the burners or nozzles 25, and in order to cool the joint thus soldered, the valve 38 is then opened and this will permit the cooling fluid to flow into the chamber 26, through the pipe 37 and arms 27 to be discharged from the chamber through the burners or nozzles 25 against the tank. After the joint has been thus cooled, the valve 38 may be again closed. If desired, the joint thus formed may be cooled from the inside of the body and for this purpose a nozzle 39 may be provided which receives its supply of cooling fluid, preferably water, through a pipe 40 having a controlling valve 41 and this pipe 40 receives its supply from any suitable source.

What is claimed as new is—

1. In a machine of the character described, the combination of a support for the article, a burner for heating the article, a weighted arm for moving the burner with respect to the support and toward and away from the article, said weighted arm also serving to maintain the burner in each of its adjusted positions, and means controlled by such adjustment for controlling the supply of fuel to the burner.

2. In a machine of the character described, the combination of a support for the article, means engaging the article and support for securing the article upon the support, a burner for heating the article, means for supplying fuel to the burner, said burner being adapted for movement with respect to the support and toward and away from the article, and means whereby such movement of the burner will automatically control the supply of fuel thereto.

3. In a machine of the character described, the combination of a support for cylindrical articles, means extending through the article and detachably secured to the support for holding the article thereon, a burner movable with respect to the support, toward and away from the article, means for supplying fuel to the burner, and means controlled by the adjustment of the burner for automatically controlling the supply of fuel thereto.

4. In a machine for soldering lapped sheet material, the combination of a support to hold lapped material in an uncurved position to form an upwardly extending shoulder, clamping means for securing the lapped material together and to the support, a burner to direct heat toward that portion of the support where a shoulder of the lapped material is disposed, fuel supply means for the burner, and means for controlling said supply.

5. In a machine for soldering lapped sheet material, the combination of a support for lapped sheets to hold them with an upright angular groove, means for clamping lapped sheets to the support to position a groove formed thereby, a burner for heating the sheets to be soldered adjacent the groove formed by their lapping, fuel supply means for the burner, and means for automatically controlling the supply.

6. In a machine for soldering lapped sheet material, the combination with a support for holding lapped material to form an internal shoulder and a level upright groove adjacent thereto, of clamping means for holding lapped sheets in position so that the groove formed thereby will contain solder, a burner for heating the sheets to be soldered adjacent the shoulder and the groove movable with respect to the support in an arc toward and away from the material to be soldered, fuel supply means for the burner, and means whereby the movement of the burner will automatically control the fuel supply means.

7. In a machine of the class described, the combination of a horizontally movable support for holding an article to be soldered at an angle to the horizontal, a burner for heating an angular edge of an article to be soldered, said support being movable relatively to said burner, means for imparting such relative movement, fuel supply means for the burner, and positive means whereby such relative movement will control the supply of fuel to the burner.

8. In a machine of the class described, the combination of spaced supports for an article to be soldered arranged at an angle to each other movable together and with both of which an article to be soldered has engagement, a burner disposed to direct its flame against an article between the supports, said supports being movable relatively to the burner, means for supplying fuel to the burner, and means controlled by such movement of the supports for controlling the supply of fuel to the burner.

In testimony whereof I have signed my name to this specification, in the presence of two subscribing witnesses, on this ninth day of January A. D. 1911.

SYLVANUS F. BOWSER.

Witnesses:
  J. W. Burrows,
  R. E. Fleming.

Copies of this patent may be obtained for five cents each, by addressing the "Commissioner of Patents, Washington, D. C."